Patented Jan. 28, 1930

1,744,844

UNITED STATES PATENT OFFICE

HARLAN L. TRUMBULL, OF HUDSON, OHIO, ASSIGNOR TO THE B. F. GOODRICH COMPANY, OF NEW YORK, N. Y., A CORPORATION OF NEW YORK

DISPERSED RUBBER ISOMER

No Drawing.      Application filed June 2, 1927. Serial No. 196,151.

This invention relates to aqueous dispersions and particularly to the dispersion of certain heat-plastic derivatives of rubber of a class known as artificial rubber isomers, and has for an object to provide a new coating and impregnating composition comprising such heat-plastic rubber derivatives.

The rubber derivatives of this application are preferably those produced by treating rubber at elevated temperatures with isomerizing agents for rubber. Such reaction products have been prepared by the treatment of rubber with a wide variety of reagents which under the influence of heat convert the rubber to an isomeric form having the same empirical formula but a less chemical unsaturation than rubber and a marked change in specific gravity, from about 0.92 for rubber to about 0.97–1.00 for the rubber isomer. The preparation of these products in various ways has been described in the literature and forms per se no part of the present invention. The term "rubber isomer" as herein used is intended to include all reaction products of rubber of the above indicated character, however prepared, whether in a pure or impure state, and whether admixed with other ingredients or not.

The rubber isomers which I have employed in carrying out the present invention range from tough non-friable heat-plastic solids to hard readily grindable heat-plastic solids constituting a series of material possessing a varying range of hardness and brittleness but all having relatively low softening temperatures. I have discovered that these rubber isomers may be dispersed in an aqueous medium by milling thereinto by means of a warm rubber mill a hydrophilic colloid, such as casein, glue, gelatin, colloidal clay of the bentonite type, or the like, or mixtures of such colloids, and then masticating the batch with the gradual addition of water, which may or may not contain a peptizing agent, not materially faster than the batch can absorb the water. In certain instances I have found it desirable to add water to the hydrophilic colloid to secure a rather viscous paste and then add thereto the rubber isomer in a softened or plastic condition obtained, for examples, by mastication with or without the addition of softening agents. The batch is masticated with the gradual addition as in the method previously referred to. In either case, it is my object to disperse the rubber isomer as the internal phase in the colloid paste, eventually arriving at a point where the finely dispersed particles are protected against coagulation or agglomeration, in which condition the dispersion may then be readily diluted with water or concentrated by evaporation to any practical degree without disturbing the dispersed condition of the rubber isomer.

Where a hard very brittle rubber isomer is to be dispersed, another method has also been found to be practical. This method involves the grinding of the rubber isomer to a fine powder and thereafter subjecting the pulverulent material to a grinding action in a high speed colloidal mill with water and a protective colloid, such as Irish moss, casein, glue, etc., the material being repeatedly fed through the mill until the particles of the rubber isomer have been reduced to colloidal fineness. Peptizing agents may also be added if desired.

The products obtained by any of the above described methods are smooth, homogeneous dispersions which may be diluted with water without causing a separating out of the suspended particles and which are readily spreadable by any of the means commonly employed, such as spraying, brushing, dipping, etc., to form a smooth thin coherent film. Films thus formed adhere with an unusual degree of tenacity to the material upon which they are formed, are impervious to liquids and gases and are highly resistant to acids, alkalies and salts. These dispersed rubber isomers have, therefore, the desirable characteristics of water paints for which purpose they have been satisfactorily employed. The aqueous dispersions of this application are particularly suited as coating materials for metals and as such may be sprayed, brushed, or otherwise applied directly to the metals and the coatings dried without causing material corrosion of the metal. Successive coatings may be applied to provide a protective film of any desired thickness.

The impregnation of fabrics, wood, leather and other porous materials with rubber isomers may be advantageously effected by means of the aqueous dispersions of this application. Thus, I may take a fibrous material, either woven or unwoven, and coat it, by dipping, spraying, brushing or other analogous process, with an aqueous solution of the rubber isomer, the dispersion possessing such characteristics that the dispersed rubber isomer particles are readily taken up by the fibers of the material. Examination indicates that the dispersed particles are not only absorbed on the surfaces of the fibers, but that they penetrate into the interstices between the fibers themselves. This property of the aqueous dispersions of rubber isomers to impregnate fibrous materials and other porous bodies is distinctive of these materials at least to the extent that they have this power in an unusual degree.

It will be understood that numerous modifications and variations in the process and product hereinabove described, may be made and that compounding ingredients and vulcanizing agents may be added to the rubber isomers either before dispersion or after dispersion without departing from the principles of this invention, and I therefore do not desire to limit the claims hereof to the specific examples hereinabove given.

I claim:

1. A new composition comprising a rubber isomer dispersed in an aqueous medium containing a hydrophilic colloid.

2. A new composition comprising a tough, non-friable heat-plastic rubber isomer dispersed in an aqueous medium containing a protective colloid.

3. A new composition comprising a dispersion in aqueous medium containing a protective colloid of a reaction product of rubber with an isomerizing agent of rubber.

4. A new composition comprising a dispersion in aqueous medium containing a protective colloid of a reaction product of rubber composed in major part of a rubber isomer.

5. A new composition comprising an artificial isomer of rubber dispersed in liquid medium which is substantially a non-solvent of the isomer of rubber and which contains a protective colloid.

In witness whereof I have hereunto set my hand this 26th day of May, 1927.

HARLAN L. TRUMBULL.